United States Patent
Volant et al.

(10) Patent No.: US 12,359,700 B2
(45) Date of Patent: Jul. 15, 2025

(54) BRAKE WITH INTEGRATED MOTOR POSITION SENSOR

(71) Applicant: Warner Electric Technology LLC, Braintree, MA (US)

(72) Inventors: Eric Volant, Denee (FR); Jonathan Matthew Volk, West Haven, CT (US); Kévin Rousseau, Briollay (FR); Bryan Trim, Crystal Lake, IL (US)

(73) Assignee: Warner Electric Technology LLC, Braintree, MA (US)

( * ) Notice: Subject to any disclaimer, the term of this patent is extended or adjusted under 35 U.S.C. 154(b) by 0 days.

(21) Appl. No.: 18/632,932

(22) Filed: Apr. 11, 2024

(65) Prior Publication Data
US 2025/0043839 A1    Feb. 6, 2025

(30) Foreign Application Priority Data
Aug. 3, 2023    (EP) ..................................... 23189401

(51) Int. Cl.
*B60T 13/04*    (2006.01)
*F16D 55/02*    (2006.01)
(Continued)

(52) U.S. Cl.
CPC .............. *F16D 66/00* (2013.01); *F16D 55/02* (2013.01); *F16D 65/186* (2013.01); *F16D 2066/003* (2013.01); *F16D 2121/22* (2013.01)

(58) Field of Classification Search
CPC ........ F16D 55/02; F16D 59/02; F16D 65/186; F16D 2121/22
See application file for complete search history.

(56) References Cited

U.S. PATENT DOCUMENTS

| | | | |
|---|---|---|---|
| 5,444,369 A | * | 8/1995 | Luetzow ................ G01D 5/145 123/376 |
| 6,264,256 B1 | | 7/2001 | Hankel et al. |

(Continued)

FOREIGN PATENT DOCUMENTS

| | | | |
|---|---|---|---|
| CN | 208255259 U | | 12/2018 |
| CN | 214293189 U | * | 9/2021 |

(Continued)

OTHER PUBLICATIONS

Machine translation of CN 214293189 (no date).*

(Continued)

*Primary Examiner* — Nicholas J Lane
(74) *Attorney, Agent, or Firm* — Reising Ethington P.C.

(57) ABSTRACT

A brake includes a rotor rotatably coupled to a rotating body for rotation about a rotational axis. A brake plate and an armature are disposed on opposite sides of the rotor. A spring and an electromagnet urge the armature in opposite directions into and out of engagement with the rotor to move the rotor into and out of engagement with the brake plate and engage and disengage the brake. The brake plate and electromagnet each define a central bore configured to receive the rotating body. The brake is characterized by a target supported on a radially extending face of the rotating body or the rotor and a sensor aligned with the target through the central bore of the brake plate or the electromagnet. The sensor generates, responsive to the target, position signals indicative of a rotational position of the rotor and rotating body.

15 Claims, 9 Drawing Sheets

(51) Int. Cl.
*F16D 65/18* (2006.01)
*F16D 66/00* (2006.01)
*F16D 121/22* (2012.01)

(56) References Cited

U.S. PATENT DOCUMENTS

| | | | | |
|---|---|---|---|---|
| 6,776,396 | B2* | 8/2004 | Miyoshi | B66D 5/14 |
| | | | | 188/164 |
| 8,727,696 | B2 | 5/2014 | Cox | |
| 10,273,119 | B2 | 4/2019 | Hubbard et al. | |
| 10,731,737 | B2 | 8/2020 | Dietrich et al. | |
| 10,960,865 | B2 | 3/2021 | Feigel et al. | |
| 11,705,798 | B2* | 7/2023 | Wolfram | H02K 11/215 |
| | | | | 310/12.02 |
| 11,820,012 | B1* | 11/2023 | Wang | B25J 17/00 |
| 2003/0218392 | A1* | 11/2003 | Frey | H02K 11/215 |
| | | | | 310/68 B |
| 2004/0239196 | A1* | 12/2004 | Miura | H02P 3/04 |
| | | | | 318/372 |
| 2010/0109459 | A1* | 5/2010 | Takahashi | B25J 19/0079 |
| | | | | 310/83 |
| 2010/0294603 | A1* | 11/2010 | St. Clair | B60T 17/22 |
| | | | | 188/267 |
| 2011/0130238 | A1* | 6/2011 | Schoon | B60K 17/046 |
| | | | | 475/149 |
| 2013/0048461 | A1 | 2/2013 | Pardee | |
| 2017/0005542 | A1* | 1/2017 | Hisamatsu | H02K 7/08 |
| 2018/0010926 | A1* | 1/2018 | Forthaus | G01D 5/24433 |
| 2018/0159405 | A1* | 6/2018 | Strasser | G01D 5/34746 |
| 2019/0064018 | A1* | 2/2019 | Miyazawa | B25J 19/027 |
| 2019/0170201 | A1 | 6/2019 | Godinsky | |
| 2020/0132149 | A1 | 4/2020 | Chandrasekara et al. | |
| 2020/0318700 | A1 | 10/2020 | Mitelman et al. | |
| 2021/0207667 | A1 | 7/2021 | Fichtner-Pflaum et al. | |
| 2021/0300188 | A1 | 9/2021 | Kato et al. | |
| 2021/0404525 | A1* | 12/2021 | Fukasawa | F16D 65/123 |
| 2023/0098680 | A1 | 3/2023 | Essenmacher | |

FOREIGN PATENT DOCUMENTS

| | | | | |
|---|---|---|---|---|
| DE | 19814078 A1 * | 10/1999 | | F16D 55/28 |
| DE | 102006041812 A1 | 3/2008 | | |
| DE | 102010028075 A1 * | 10/2011 | | F16D 65/186 |
| DE | 102020006900 A1 * | 6/2021 | | |
| EP | 0978611 A2 | 2/2000 | | |
| KR | 0126688 Y1 | 12/1998 | | |
| WO | WO-2019048742 A1 * | 3/2019 | | F16D 55/228 |

OTHER PUBLICATIONS

Machine translation of DE 102020006900 (no date).*
Machine translation of DE 19814078 (no date).*
Machine translation of DE 10 2010 028075 (no date).*
Machine translation of WO 2019048742 (no date).*
Valin Corporation, "Spring-applied brakes with integrated speed sensor".
English (machine) Translation of CN 208255259 U.
English (machine) translation of DE 102006041812 A1.
English (machine) translation of EP 0978611 A2.
English (machine) translation of KR 0126688 Y1.
Extended European Search Report issued in priority European App. No. 23189401.5 (Feb. 1, 2024).

* cited by examiner

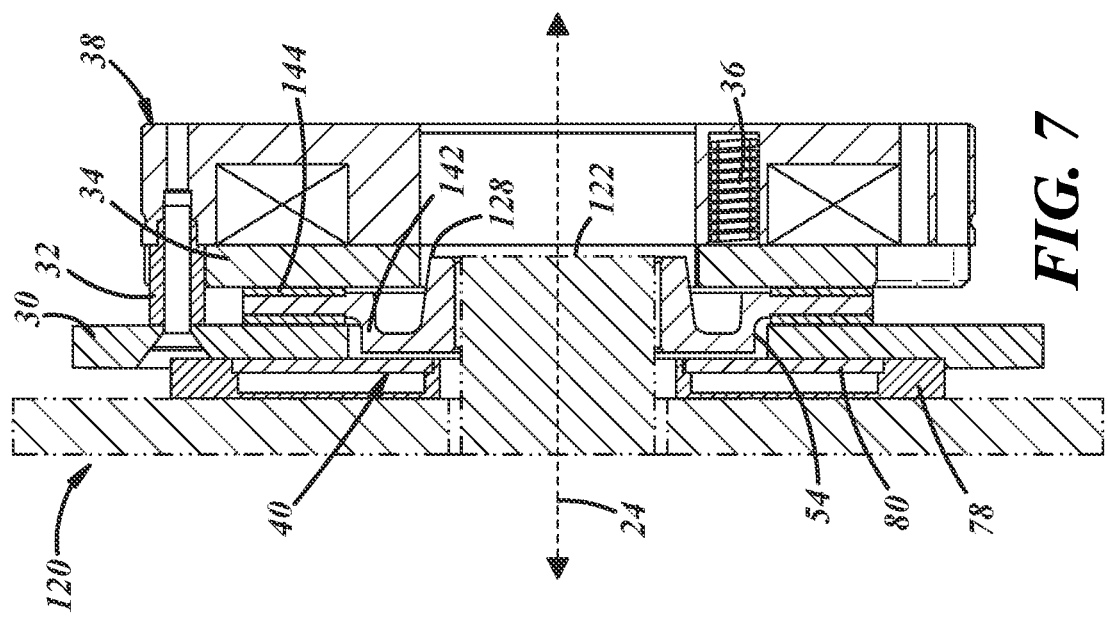
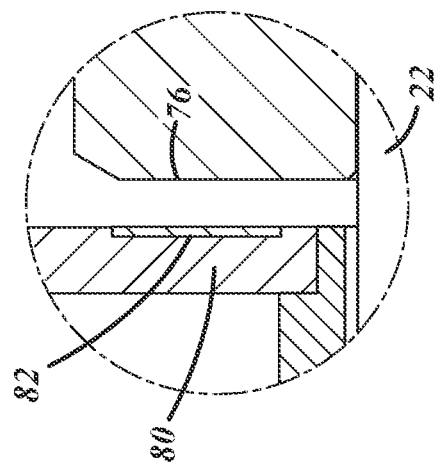
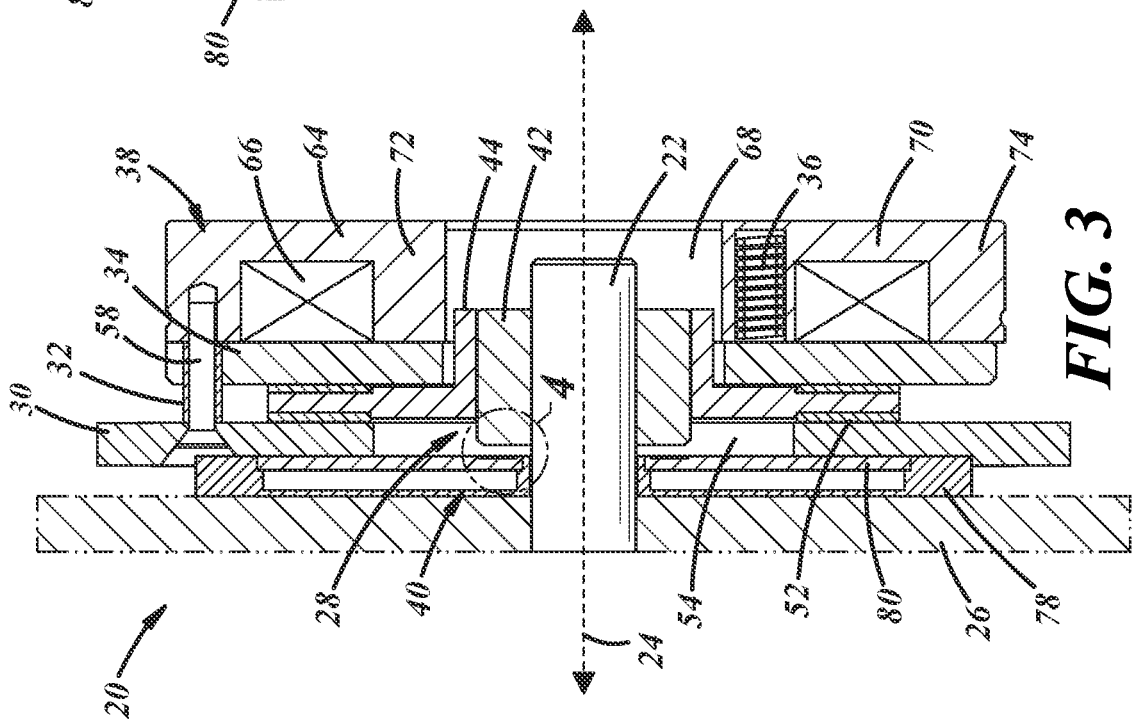

BRAKE WITH INTEGRATED MOTOR POSITION SENSOR

BACKGROUND OF THE INVENTION a. Field of the Invention

This disclosure relates to a brake used to inhibit rotation of a rotating body such as a motor output shaft. In particular, the disclosure relates to a brake integrated with a sensor assembly for use in determining the rotational position of the rotating body.

b. Background Art

Brakes are frequently used to control the rotation of driven bodies such as a motor output shaft. In many applications, it is important to also monitor the position of the motor output shaft. The position is typically monitored using a resolver or a rotary encoder having a wheel coupled to the motor output shaft and a position sensor that tracks movement of the wheel as it rotates with the motor output shaft. Conventional resolvers and encoders, however, consume valuable space. When an encoder is used in combination with a brake, the wheel of the encoder is typically spaced axially from the brake thereby requiring a relatively long motor output shaft to accommodate both the brake and the encoder.

The inventors herein have recognized a need for a brake that will minimize and/or eliminate one or more of the above-identified deficiencies.

BRIEF SUMMARY OF THE INVENTION

This disclosure relates to a brake used to inhibit rotation of a rotating body such as a motor output shaft. In particular, the disclosure relates to a brake integrated with a sensor assembly for use in determining the rotational position of a rotating body.

A brake in accordance with one embodiment includes a rotor configured for coupling to a rotating body for rotation therewith about a rotational axis. An annular brake plate is disposed about the rotational axis on a first side of the rotor and defines a central bore configured to receive the rotating body. An armature is disposed about the rotational axis on a second side of the rotor. A spring is configured to urge the armature in a first axial direction towards, and into engagement with, the rotor thereby urging the rotor in the first axial direction towards, and into engagement with, the brake plate to brake rotation of the rotor and rotating body. An annular electromagnet is disposed on an opposite side of the armature relative to the rotor and defines a central bore configured to receive the rotating body. The electromagnet is configured to urge, when current is delivered to the electromagnet, the armature in a second axial direction away from, and out of engagement with, the rotor. The brake is characterized by a target supported on a radially extending face of one of the rotating body and the rotor and a sensor aligned with the target through the one of the central bore of the brake plate and the central bore of the electromagnet and configured to generate, responsive to the target, position signals indicative of a rotational position of the rotor and rotating body.

A brake in accordance with the present teachings is advantageous relative to conventional brakes. The brake integrates a sensor assembly in a manner that is relatively compact in the direction of the rotational axis of a rotating body such as a motor output shaft. As a result, the brake allows the rotational position of the motor output shaft to be determined without the need for a substantial increase in the axial length of the motor output shaft.

The foregoing and other aspects, features, details, utilities, and advantages of the invention will be apparent from reading the following detailed description and claims, and from reviewing the accompanying drawings illustrating features of this invention by way of example.

BRIEF DESCRIPTION OF THE DRAWINGS

FIG. 3 is a cross-sectional view of the brake of FIGS. 1-2.

FIG. 4 is an enlarged cross-sectional view of a portion of the brake of FIGS. 1-3.

FIG. 7 is a cross-sectional view of the brake of FIGS. 5-6.

DETAILED DESCRIPTION OF THE INVENTION

Figure 1:
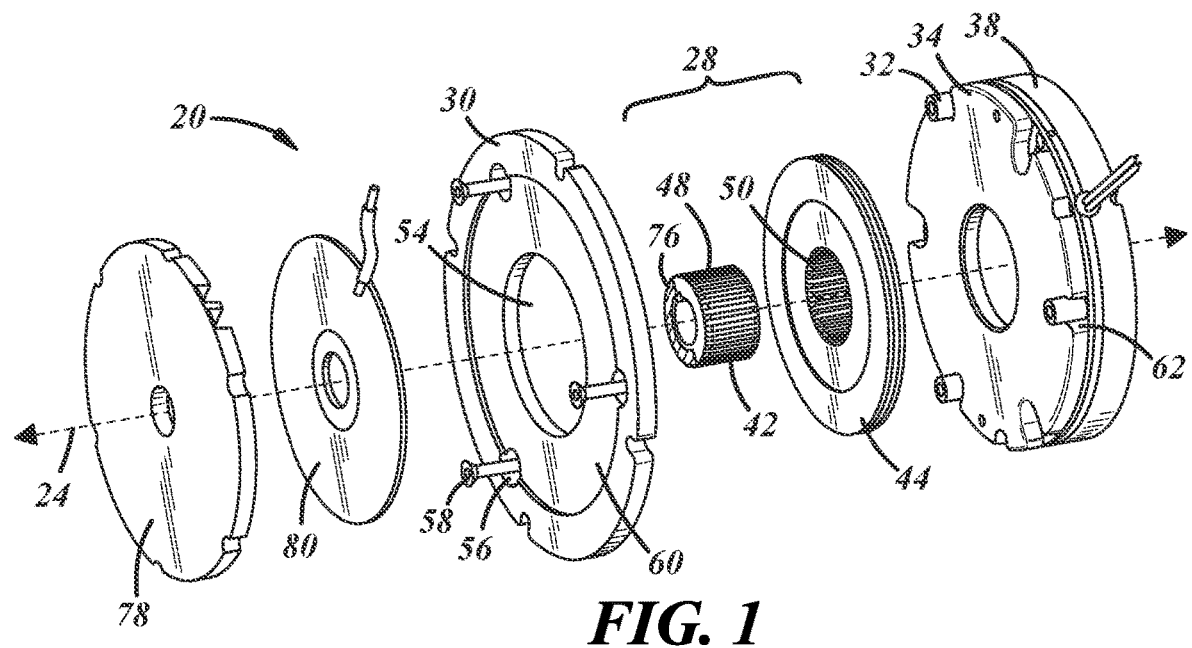
FIGS. 1-2 are exploded perspective views of a brake in accordance with one embodiment of the present teachings.

Referring now to the drawings wherein like reference numerals are used to identify identical components in the various views, FIGS. 1-4 illustrates a brake 20 in accordance with one embodiment of the present invention. Referring to FIG. 3, brake 20 is provided to generate a braking torque on a rotating body 22 such as a shaft, gear, pulley, blade, etc. in order to slow or halt rotation of body 22 (i.e., a service brake) or prevent rotation of body 22 (i.e., an emergency brake) about a rotational axis 24. It will be understood by those of ordinary skill in the art that brake 20 may be used in a wide variety of industrial and other applications requiring a brake. Body 22 may be solid or tubular. Body 22 may be driven by an electric motor, an engine, or other conventional power source (not shown). In the illustrated embodiment body 22 includes a radially extending flange 26 proximate one axial end of body 22 that may comprise, for example, a gear configured for engagement with another gear or a pulley configured to receive a belt or chain. Brake 20 may include a rotor 28, a brake plate 30, spacers 32, an armature 34, springs 36, and an electromagnet 38. In accordance with the teachings herein, brake 20 further includes a sensor assembly 40 for generating an indication of the rotational position of body 22 and rotor 28.

Rotor 28 is provided for selective engagement with brake plate 30 and armature 34 to transmit a braking torque to body 22. Rotor 28 may be made from a variety of conventional materials including plastics and may be made by stamping, molding and/or machining. Rotor 28 is disposed about, and may be centered about, axis 24 and is coupled to body 22 for rotation therewith about axis 24. Rotor 28 may include a hub 42 and a rotor or coupling disc 44.

Figure 2:
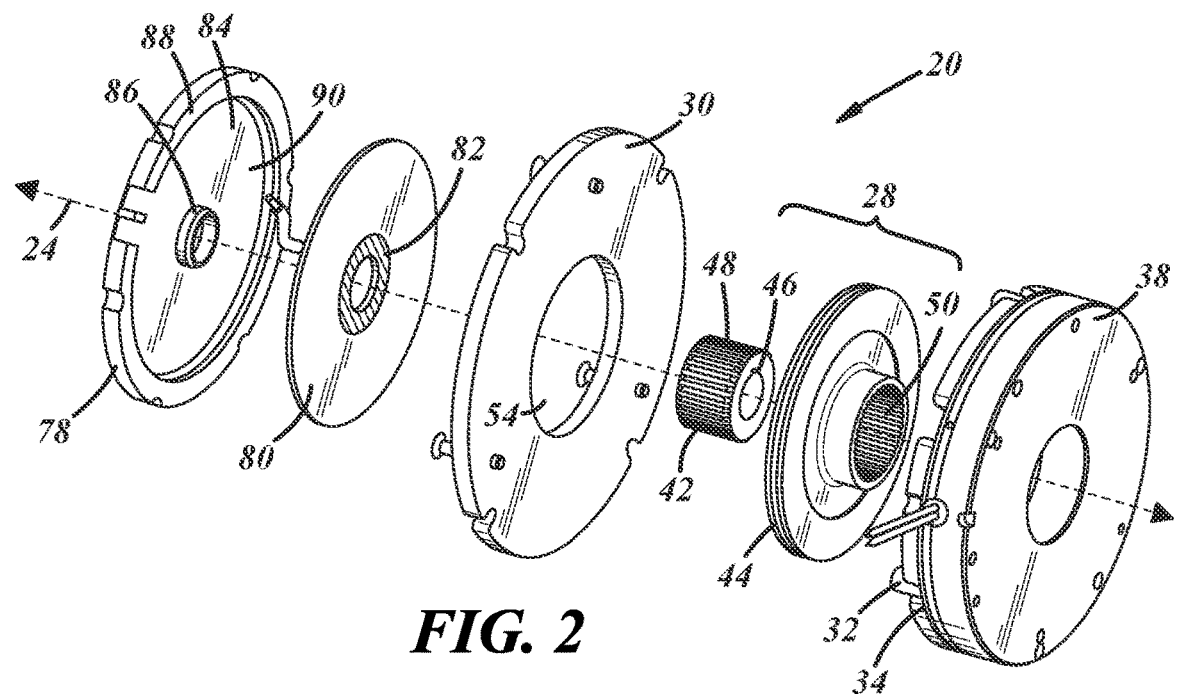

Hub 42 is tubular and defines a central bore into which body 22 extends. Referring to FIG. 2, hub 42 may define an axially extending keyway 46 shaped complementary to, and configured to receive, a key (not shown) formed in, or received in a corresponding keyway of, body 22. Alternatively, hub 42 may be shaped with an integral, radially extending key configured to be received within a keyway in body 22. Hub 42 defines a plurality of axially extending splines 48 on a radially outer surface for a purpose described below.

Disc 44 is supported on, and extends radially outwardly from, hub 42. Disc 44 is tubular and defines a central bore configured to receive hub 42 and body 22. A radially inner surface of disc 44 may define a plurality of axially extending splines 50 configured for engagement with splines 48 of hub 42 in order to prevent relative rotation of hub 42 and disc 44, but allow axial movement of disc 44 relative to hub 42 along axis 24. Referring to FIG. 3, a radially outer portion of disc 44 is configured to be receive axially between brake plate 30 and armature 34 and defines engagement surfaces on either axial side configured for engagement with brake plate 30 and armature 34. Each engagement surface of disc 44 may support one or more friction pads 52 made from conventional friction materials.

Brake plate 30 is configured for engagement with rotor 28 during application of brake 20 to transmit a braking torque to rotor 28. Brake plate 30 provides a reaction surface against which armature 34 presses rotor 28 during application of brake 20. Brake plate 30 may be made from conventional metals, plastics or composites. Brake plate 30 is annular and may be disposed about, and centered about axis 24. Brake plate 30 defines a central bore 54 configured to receive body 22 and a portion of hub 42 of rotor 28. Referring to FIG. 1, brake plate 30 further defines a plurality of fastener bores 56 configured to receive fasteners 58 such as bolts, pins, or screws extending therethrough for coupling brake plate 30 to electromagnet 38 and fixing brake plate 30 against rotation. One axial side of brake plate 30 faces rotor 28 and defines a brake engagement surface configured for engagement with rotor 28 during application of brake 20. The other axial side of brake plate 30 defines an annular recess 60 surrounding central bore 54 and configured to receive components of sensor assembly 40 as discussed in greater detail hereinbelow.

Spacers 32 establish the axial spacing of brake plate 30 and electromagnet 38. Spacers 32 engage opposing faces of brake plate 30 and electromagnet 39. Spacers 30 are tubular in shape and are configured to receive fasteners 58 extending from brake plate 30 into electromagnet 38. The axial length of each spacer 32 is greater than the combined axial length of armature 34 and disc 44 such that, when brake 20 is disengaged, air gaps exist between brake plate 30 and disc 44 and between armature 34 and disc 44. Spacers 32 of varying length may be used over the life of brake 20 to adjust the axial spacing of brake plate 30 and electromagnet 38 to compensate for wear on the brake engagement surfaces of brake plate 30, armature 34 and disc 44 and resulting increases in the air gaps between brake plate 30 and disc 44 and armature 34 and disc 44. Spacers 32 may be made from a material or materials (including non-magnetic materials) having a relatively high magnetic reluctance eliminate flux transfer from electromagnet 38 to brake plate 30.

Armature 34 is configured for engagement with rotor 28 during application of brake 20 to transmit a braking torque to rotor 28. Armature 34 may be made from metals or metal alloys or other materials having a relatively low magnetic reluctance such as iron or steel. Armature 34 is annular in shape and may disposed about, and may be centered about, axis 24. Armature 34 is disposed on one side of disc 44 opposite brake plate 30 and defines a brake engagement surface facing disc 44. Armature 34 is axially movable towards and away from disc 44 and brake plate 30 to permit engagement and disengagement of brake 20. Armature 34 may define a plurality of recesses 62 in a radially outer surface or bores extending through armature 34 that are configured to receive spacers 32 and fasteners 58 to thereby fix armature 34 against rotation relative to brake plate 30 and electromagnet 38.

Springs 36 provide a means for biasing armature 34 in one direction along axis 24 towards rotor 28 and brake plate 30 and away from electromagnet 38 to engage brake 20. Springs 36 are seated between armature 34 and electromagnet 38 and exert a biasing force on armature 34 urging armature 34 and rotor 28 towards brake plate 30. Springs 36 may be received with recesses formed in electromagnet 38 and disposed in an annular array about axis 24 and equally circumferentially spaced about axis 24. It should be understood that brake 20 may alternatively include a single annular spring 36 in a corresponding annular recess in electromagnet 38.

Electromagnet 38 provides a means for urging armature 34 in the opposite direction along axis 24 away from disc 44 and brake plate 30 to disengage brake 20. Electromagnet 38 also provides structural support and orients other components of brake 20 including brake plate 30 and springs 36. Referring to FIG. 3, electromagnet 38 is disposed on a side of armature 34 opposite disc 44 and includes a housing 64 or field shell and a conductor 66.

Housing 64 is provided to house conductor 66 and may also provide structural support for, and orient, other components of brake 20 including brake plate 30 and springs 36. Housing 64 also forms part of an electromagnetic circuit that attracts armature 34 towards housing 64 when current is provided to conductor 66. Housing 64 may be made from metals or metal alloys or other materials having a relatively low magnetic reluctance such as iron or steel. Housing 64 is fixed against rotation. Housing 64 is annular in shape and may be disposed about, and may be centered about axis 24. Housing 64 defines a central bore 68 through which portions of body 22 and rotor 28 may extend. Housing 64 may define a radially extending end wall 70 and axially extending, radially aligned, inner and outer walls 72, 74 that extend axially from end wall 70 towards armature 34. Inner and outer walls 72, 74 define an annular recess therebetween configured to receive conductor 66. Inner wall 72 may further define one or more closed bores configured to receive one end of each spring 36. Outer wall 74 may also define a plurality of circumferentially spaced closed bores configured to receive fasteners 58 coupling brake plate 30 to electromagnet 38.

Conductor 66 is provided to create an electromagnetic circuit among armature 34, housing 64 and conductor 66 to cause movement of armature 34 away from disc 44 to disengage brake 20. Conductor 66 may comprise a conventional wound coil or similar conductor configured to be received within housing 64 between walls 72, 74. Conductor 66 may be connected electrically to a power supply (not shown) such as a battery. Current supplied to conductor 66 creates an electromagnetic circuit including armature 34, housing 64 and conductor 66 that urges armature 34 towards housing 64 and away from disc 44 against the biasing force of springs 36 to disengage brake 20.

In accordance with the teachings herein, brake 20 further includes an integrated sensor assembly 40. Assembly 40 provides an indication of the rotational position of body 22 and rotor 28 and may be a resolver or an absolute or incremental rotary encoder. Referring to FIGS. 1-4, assembly 40 may include a target 76, a sensor housing 78, a printed circuit board 80, and a sensor 82 configured to generate position signals indicative of a rotational position of body 22 and rotor 28 responsive to target 76.

Target 76 causes sensor 82 to generate signals indicative of the rotational position of body 22 and rotor 28. Referring to FIGS. 1 and 4, target 76 is supported on a radially extending face of rotor 28 and, in particular, hub 42 of rotor 28. Target 76 may comprise a thin sheet made of a metal (e.g., copper or aluminum) that is fastened to the face of rotor 28 (e.g., using an adhesive) of overmolded onto rotor 28. Target 76 must be made from a different material than rotor 28 to enable detection of target 76 by sensor 82. Target 76 may be partially disposed within central bore 54 of brake plate 30. Referring to FIG. 1, target 76 may extend in a circumferential arc about a portion of rotor 28 and axis 24. In the illustrated embodiment, target 76 is semicircular in shape extending over one half of the circumference of rotor 28 and, in particular, hub 42.

Referring to FIGS. 1-2, sensor housing 78 is provided protect PCB 80 and sensor 82 from foreign objects and elements and to position and orient PCB 80 and sensor 82 within brake 20. In the illustrated embodiment, housing 78 is annular in shape. It should be understood, however, that the shape of housing 78 may vary. Housing 78 may be disposed about, and centered about, axis 24. Referring to FIG. 2, housing 78 includes an end wall 84 and inner and outer circumferential walls 86, 88 projecting axially from the radially innermost and outermost edges of end wall 84. Walls 84, 86, 88 together define a recess 90 configured to receive PCB 80 and sensor 82. One or more openings in wall 88 may be formed for electrical connection between PCB 80 and external electronic devices including, for example, controllers (e.g., a motor controller), visual displays or other user interface elements, and/or monitoring devices.

PCB 80 supports sensor 82. PCB 80 may further support other electronic circuit elements including those used in pre-processing (e.g., amplification, conditioning, etc.) of signals generated by sensor 82 before transmission to external electronic devices. In the illustrated embodiment, PCB 80 is annular in shape. It should be understood, however, that the shape of PCB 80 may vary. PCB 80 may define a central bore that is disposed about, and centered about, axis 24 and that is configured to receive body 22 therethrough. PCB 80 is configured to be received within recess 90 in sensor housing 78. Referring to FIG. 1, PCB 80 and sensor housing 78 may be further configured to be received within recess 60 in brake plate 30 to further protect PCB 80 and sensor 82 from foreign objects and elements.

Sensor 82 generates signals, responsive to target 76, indicative of the rotational position of body 22 and rotor 28. Sensor 82 is supported on PCB 80. In one embodiment, sensor 82 comprises an inductive sensor including three coils printed as copper traces on PCB 80. The coils include a transmitter coil and two receiver coils. The transmitter coil induces a voltage in the receiver coils creating a magnetic field that induces eddy currents in target 76 thereby producing another magnetic field that interacts with the magnetic field generated by the coils (in embodiments in which an inductive sensor is used, rotor 28 must be formed of a non-metallic material so that rotor 28 does not impact the generated fields). The interacting magnetic fields cause variation in the induced voltage in the receiver coils that is dependent on the position and movement of target 76. Although an inductive sensor is described herein, it should be understood that different types of optical and magnetic sensors could be used (which may in turn, result in a different configuration for target 76). The coils for sensor 82 extend circumferentially about at least a portion of PCB 80 and axis 24 and in certain embodiments may completely encircle axis 24 such that sensor 82 is annular in shape. Sensor 82 is axially spaced from target 76 and is aligned with target 76 through the central bore 54 of brake plate 30. The arrangement and positioning of target 76 and sensor 82 results in a sensor assembly 40 that minimizes the axial space required by the assembly 40 and, therefore, the axial length of body 22.

Figure 5:
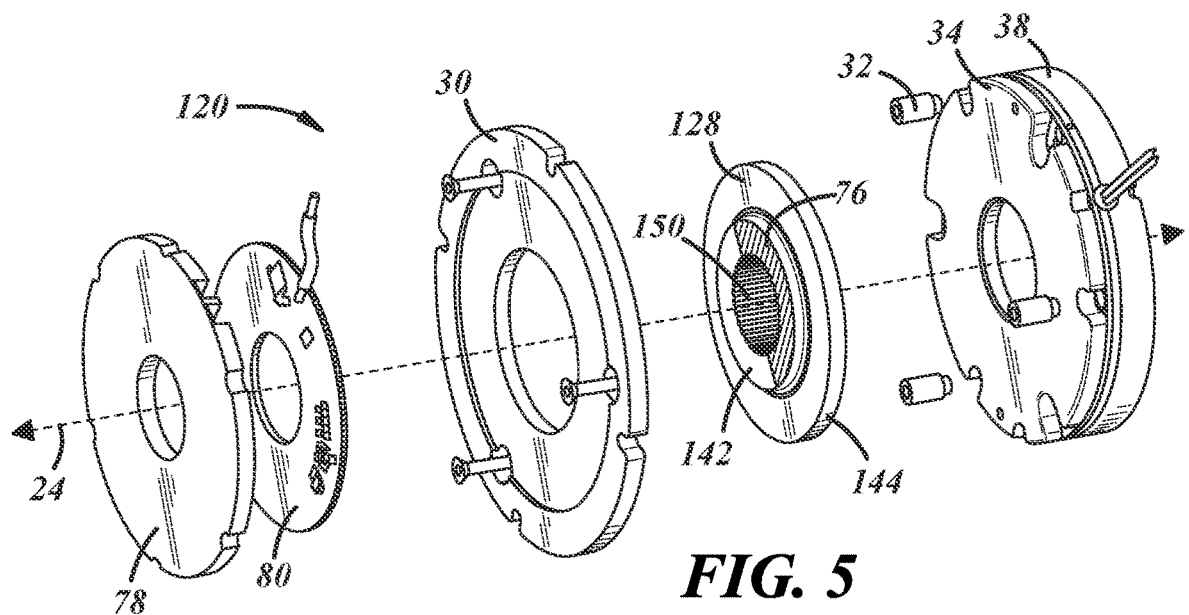
FIGS. 5-6 are exploded perspective views of a brake in accordance with another embodiment of the present teachings.
Figure 6:
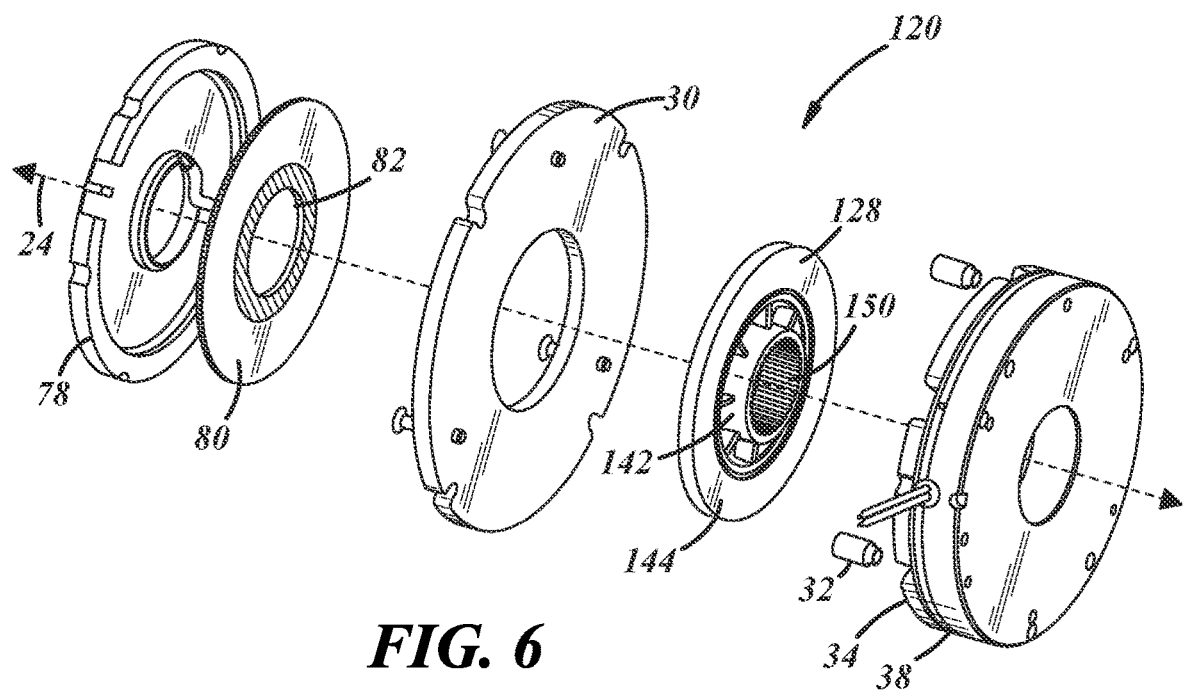
Figure 8:
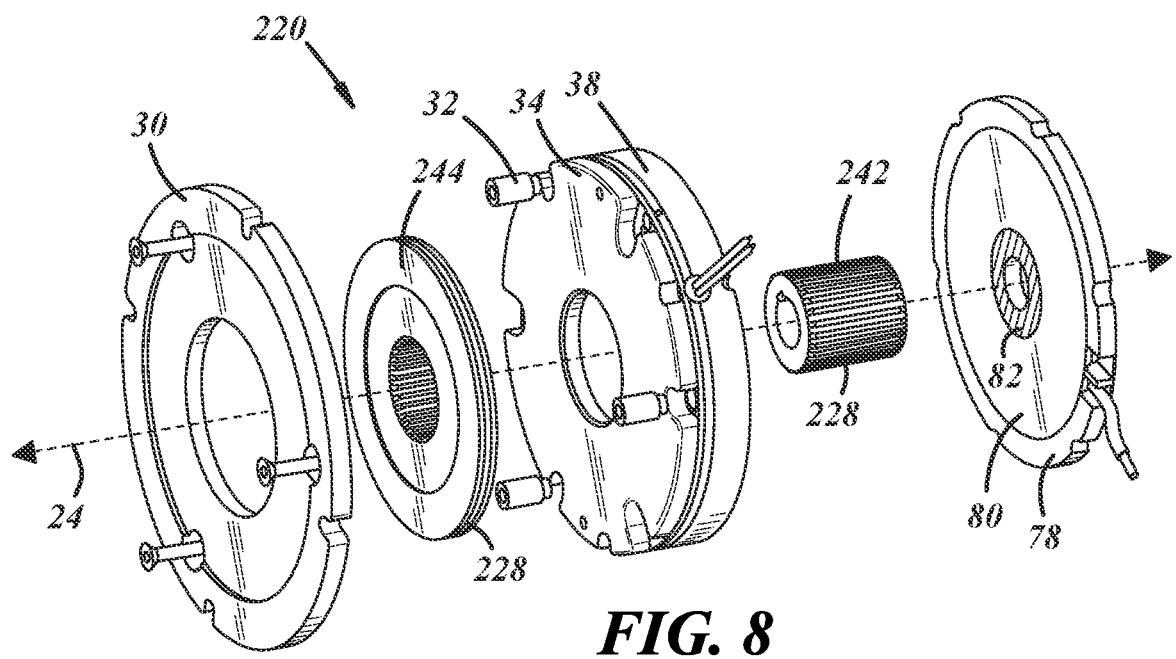
FIGS. 8-9 are exploded perspective views of a brake in accordance with another embodiment of the present teachings.

Referring now to FIGS. 5-7, a brake 120 in accordance with another embodiment of the invention is illustrated. Brake 120 is substantially similar to brake 20 and like reference numbers are used to identify similar components. Brake 120 differs from brake 20 in that rotor 128 does not include a separate hub and disc, but is instead a unitary (one-piece) body. Rotor 128 includes a hub portion 142 and a disc portion 144.

Referring to FIG. 7, hub portion 142 is tubular and defines a central bore into which a driven body 122 extends. Referring to FIGS. 5-6, hub portion 142 may define a plurality of axially extending splines 150 configured for engagement with corresponding splines on body 122 in order to prevent relative rotation of rotor 128 and body 122, but allow axial movement of rotor 128 relative to body 122 along axis 24.

Disc portion 144 extends radially outwardly from hub portion 142. Disc portion 144 is configured to be receive axially between brake plate 30 and armature 34 and defines engagement surfaces on either axial side configured for engagement with brake plate 30 and armature 34. Each engagement surface of disc portion 142 may support one or more friction pads made from conventional friction materials.

Referring to FIG. 5, target 76 is supported on a radially extending face of hub portion 142 of rotor 128. Target 76 may again extend in a circumferential arc about a portion of rotor 128 and axis 24 and, in the illustrated embodiment, target 76 is semicircular in shape extending over one half of the circumference of hub portion 142 of rotor 128. Referring to FIG. 7, target 76 may be disposed within central bore 54 of brake plate 30. Sensor 82 is axially spaced from target 76 and is aligned with target 76 through central bore 54 of brake plate 30. Again, the arrangement and positioning of target 76 and sensor 82 results in a sensor assembly 40 that minimizes the axial space required by the assembly 40 and, therefore, the axial length of body 22.

Figure 9:
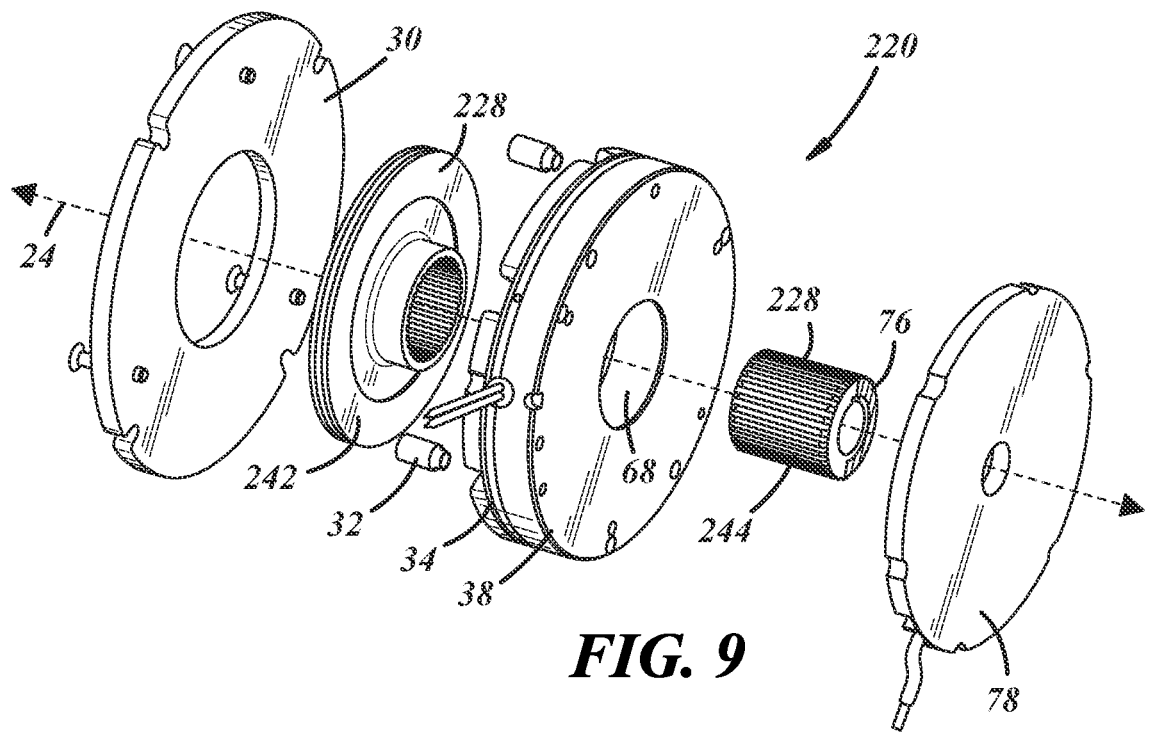
Figure 10:
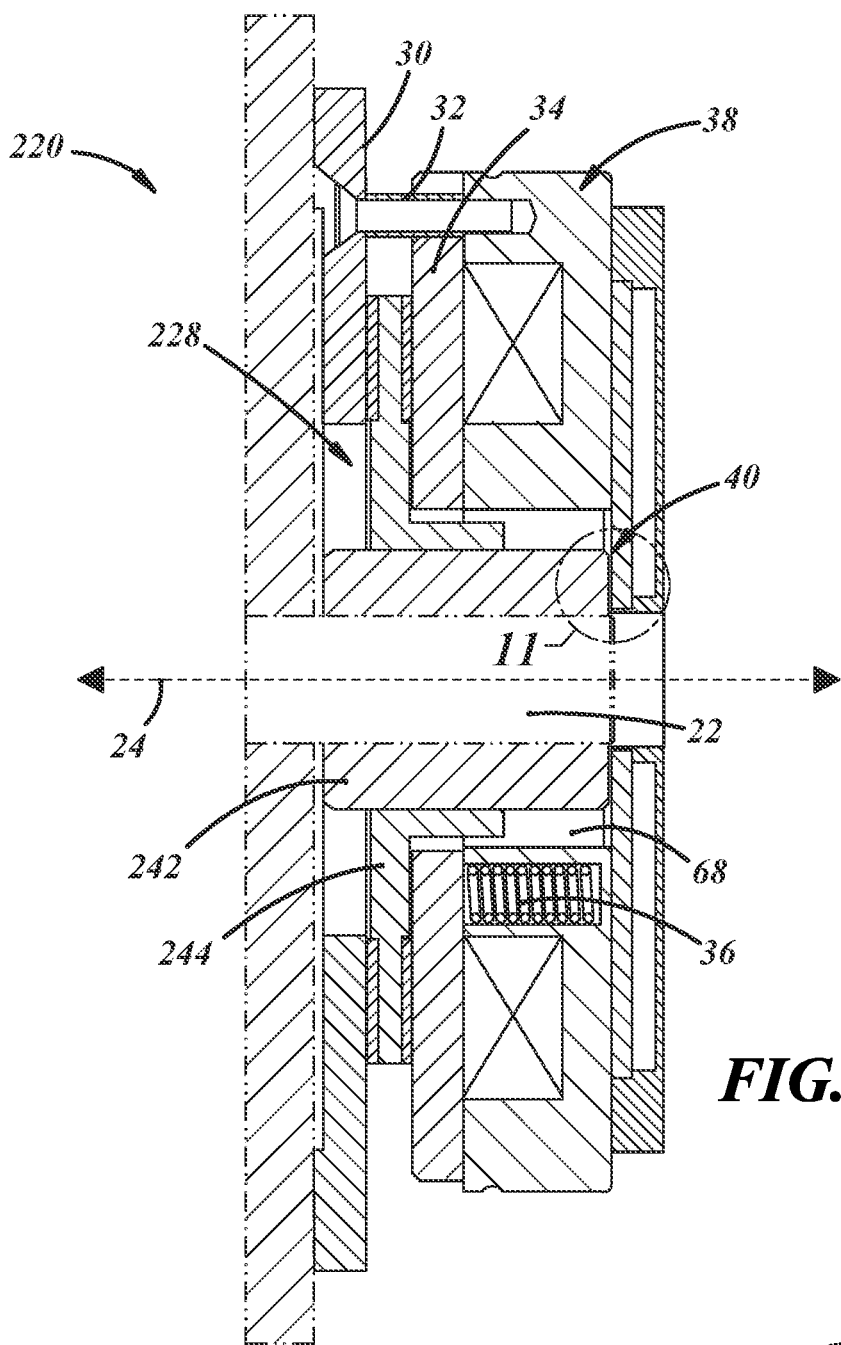
FIG. 10 is a cross-sectional view of the brake of FIGS. 8-9.
Figure 11:
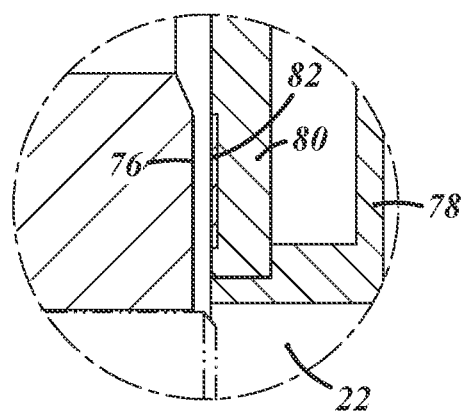
FIG. 11 is an enlarged cross-sectional view of a portion of the brake of FIGS. 8-10.

Referring now to FIGS. 8-11, a brake 220 in accordance with another embodiment of the invention is illustrated. Brake 220 is substantially similar to brake 20 and like reference numbers are used to identify similar components. Brake 220 differs from brake 20 in that sensor assembly 40 is located on the opposite axial side of brake 220 relative to brake 20. Referring to FIGS. 9 and 11, target 76 of assembly 40 is again supported on a radially extending face of a rotor 228 including a hub 242 and disc 244 and, in particular, hub 242 of rotor 228, but the face is found at the opposite axial end of hub 242 relative to brake 20 and may be at least partially disposed within central bore 68 of electromagnet 38. Sensor housing 78, PCB 80 and sensor 82 are configured for engagement with electromagnet 38 instead of brake plate 30 as in brake 20. Although not shown in the illustrated embodiment, electromagnet 38 may define a recess similar to recess 60 in brake plate 30 of brake 20 that is configured to receive sensor housing 78, PCB 80 and sensor 82. Sensor 82 is axially spaced from target 76 and is aligned with target 76 through the central bore 68 of electromagnet 38. The arrangement and positioning of target 76 and sensor 82 again produces a sensor assembly 40 that minimizes the axial space required by the assembly 40 and the axial length of body 22.

Referring now to FIGS. 12-15, a brake 320 in accordance with another embodiment of the invention is illustrated. Brake 320 is substantially similar to brake 220 and like reference numbers are used to identify similar components. Brake 320 differs from brake 220 in that rotor 328 does not include a separate hub and disc, but is instead a unitary (one-piece) body. Rotor 328 includes a hub portion 342 and a disc portion 344.

Figure 12:
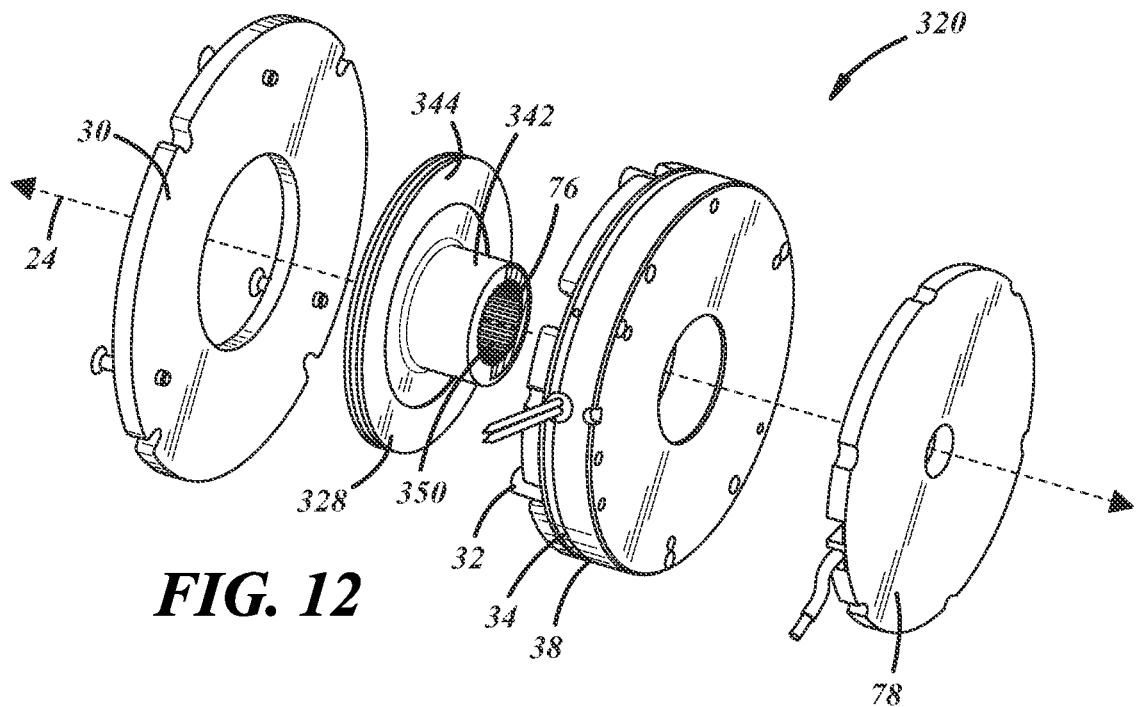
FIGS. 12-13 are exploded perspective views of a brake in accordance with another embodiment of the present teachings.
Figure 13:
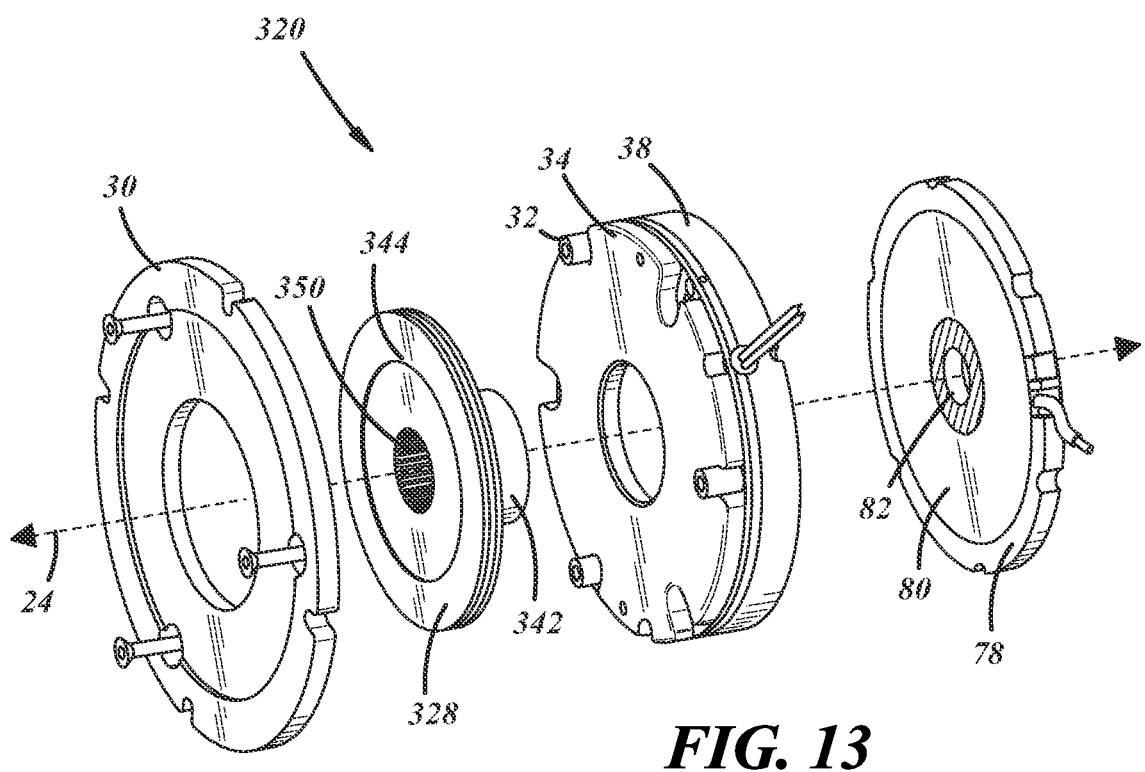
Figure 14:
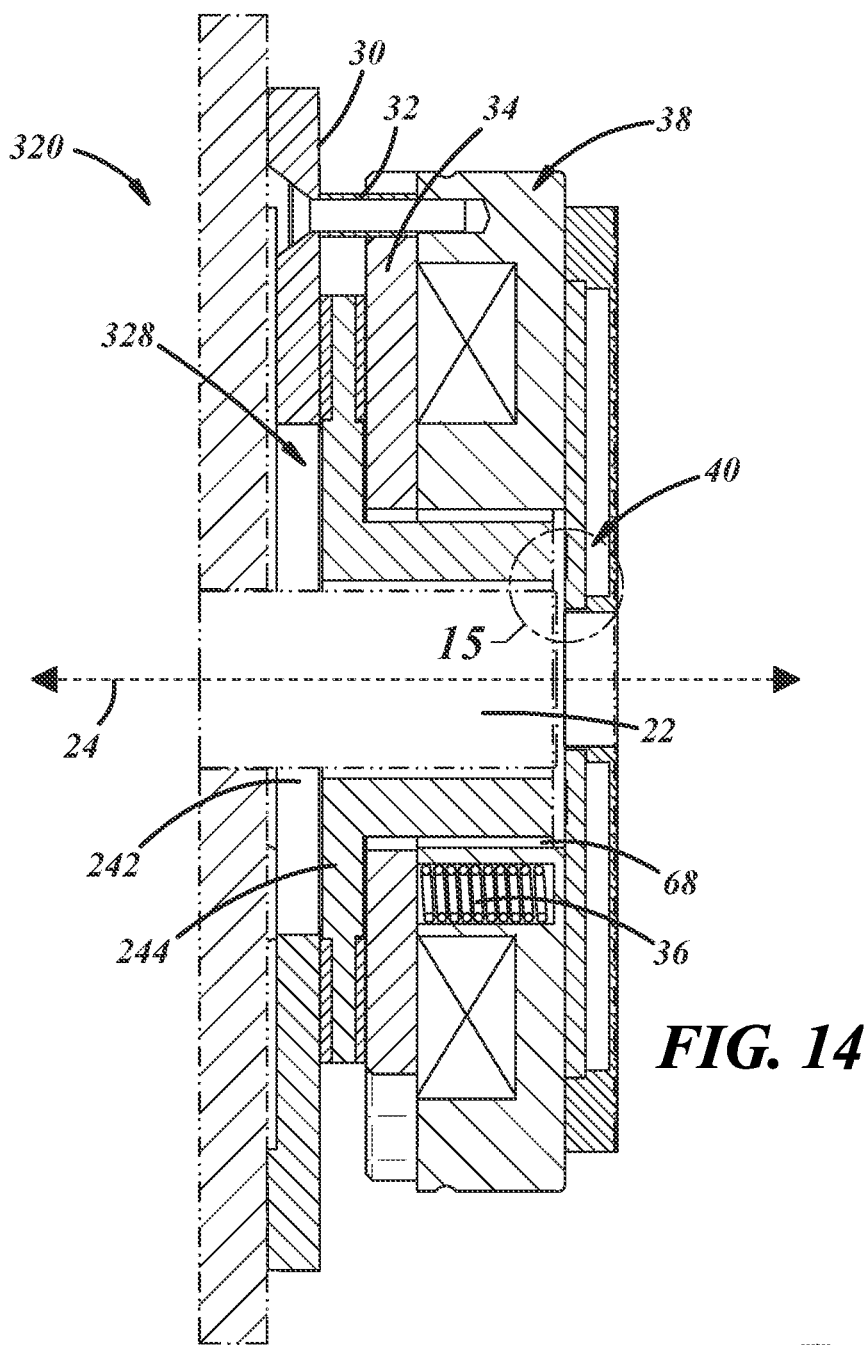
FIG. 14 is a cross-sectional view of the brake of FIGS. 12-13.
Figure 15:
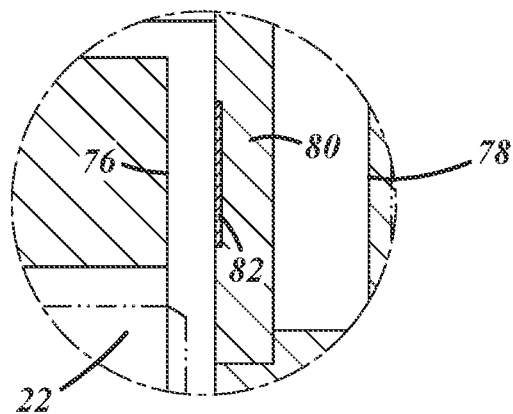
FIG. 15 is an enlarged cross-sectional view of a portion of the brake of FIGS. 12-14.

Referring to FIG. 14, hub portion 342 is tubular and defines a central bore into which driven body 22 extends. Referring to FIGS. 12-13, hub portion 342 may define a plurality of axially extending splines 350 configured for engagement with corresponding splines on body 22 in order to prevent relative rotation of rotor 328 and body 22, but allow axial movement of rotor 328 relative to body 22 along axis 24.

Disc portion 344 extends radially outwardly from hub portion 342. Disc portion 344 is configured to be receive axially between brake plate 30 and armature 34 and defines engagement surfaces on either axial side configured for engagement with brake plate 30 and armature 34. Each engagement surface of disc portion 342 may support one or more friction pads made from conventional friction materials.

Referring to FIG. 12, target 76 is supported on a radially extending face of hub portion 342 of rotor 328. Target 76 may again extend in a circumferential arc about a portion of rotor 328 and axis 24 and, in the illustrated embodiment, target 76 is semicircular in shape extending over one half of the circumference of hub portion 342 of rotor 328. Referring to FIG. 14, target 76 may be disposed within central bore 68 of electromagnet 38. Sensor 82 is axially spaced from target 76 and is aligned with target 76 through central bore 68 of electromagnet 38. Again, the arrangement and positioning of target 76 and sensor 82 results in a sensor assembly 40 that minimizes the axial space required by the assembly 40 and, therefore, the axial length of body 22.

Figure 16:
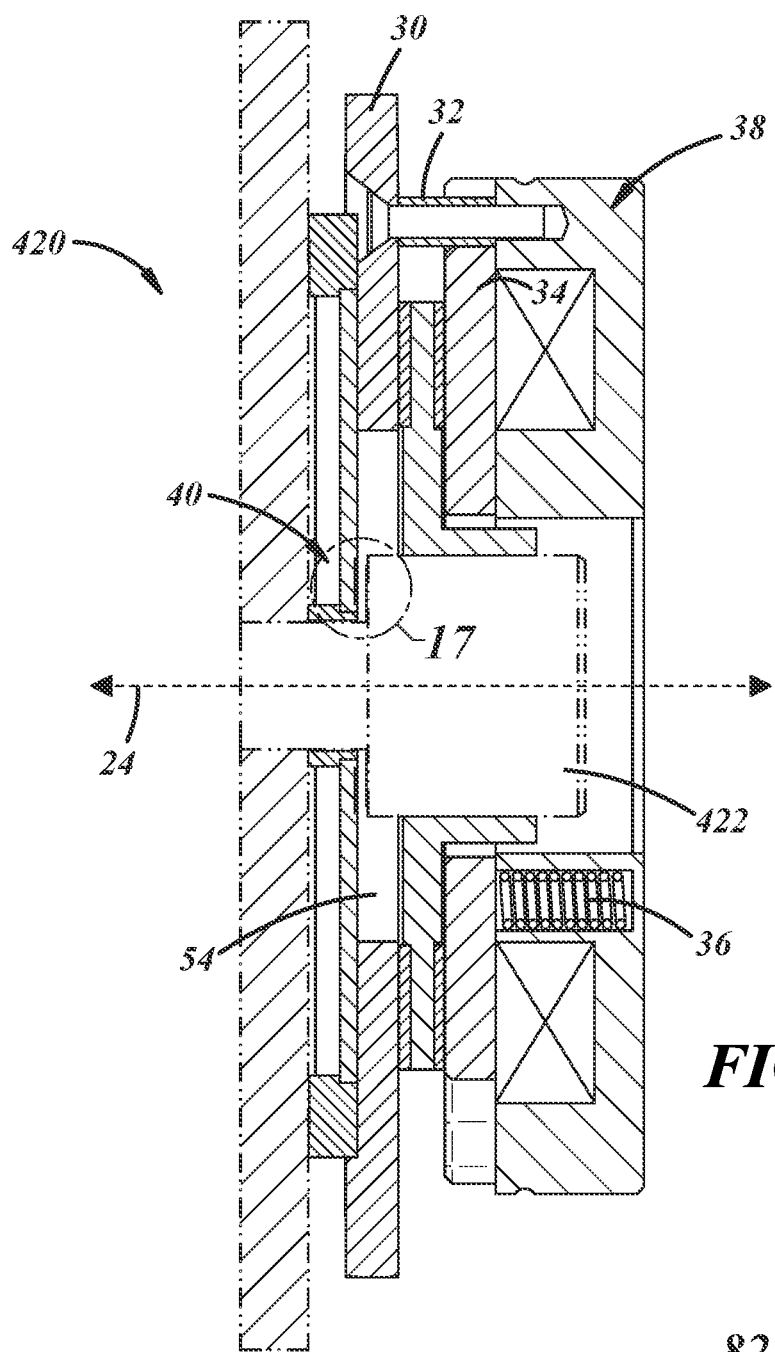
FIG. 16 is a cross-sectional view of a brake in accordance with another embodiment of the present teachings.
Figure 17:
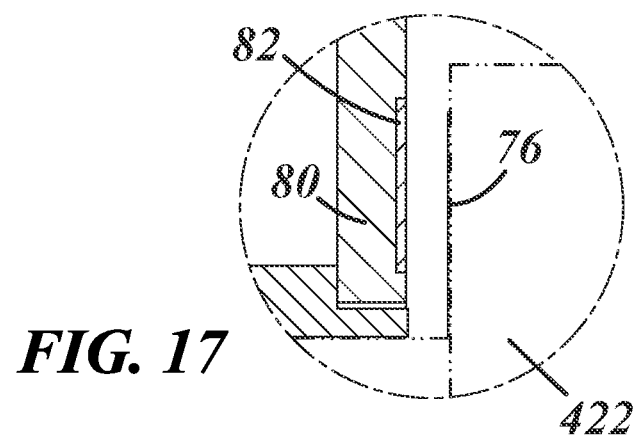
FIG. 17 is an enlarged cross-sectional view of a portion of the brake of FIG. 16.

Referring now to FIGS. 16-17, a brake 420 in accordance with another embodiment of the invention is illustrated. Brake 420 is substantially similar to other brake 20 discussed above and like reference numbers are again used to identify similar components. Brake 420 differs from brake 20 in that rotor 428 is a unitary (one-piece) body similar to rotor 228 of brake 220 discussed hereinabove (it should be understood, however, that rotor 428 may alternatively include a separate hub and disc as in other embodiments discussed herein) and target 76 is supported on the driven body 422 rather than rotor 428. In particular, body 422 is configured to define a radially extending face on which target 76 is supported. Body 422 includes a reduced diameter portion extending through sensor housing 78 and PCB 80 and into the central bore 54 of pressure plate 30 and an increased diameter portion extending from the reduced diameter portion and central bore 54 of pressure plate 30 and into a central bore of a rotor 428. The increased diameter portion defines a radially extending face at one axial end facing sensor 82 and configured to support target 76. Again, the arrangement and positioning of target 76 and sensor 82 results in a sensor assembly 40 that minimizes the axial space required by the assembly 40 and, therefore, the axial length of body 22

Figure 18:
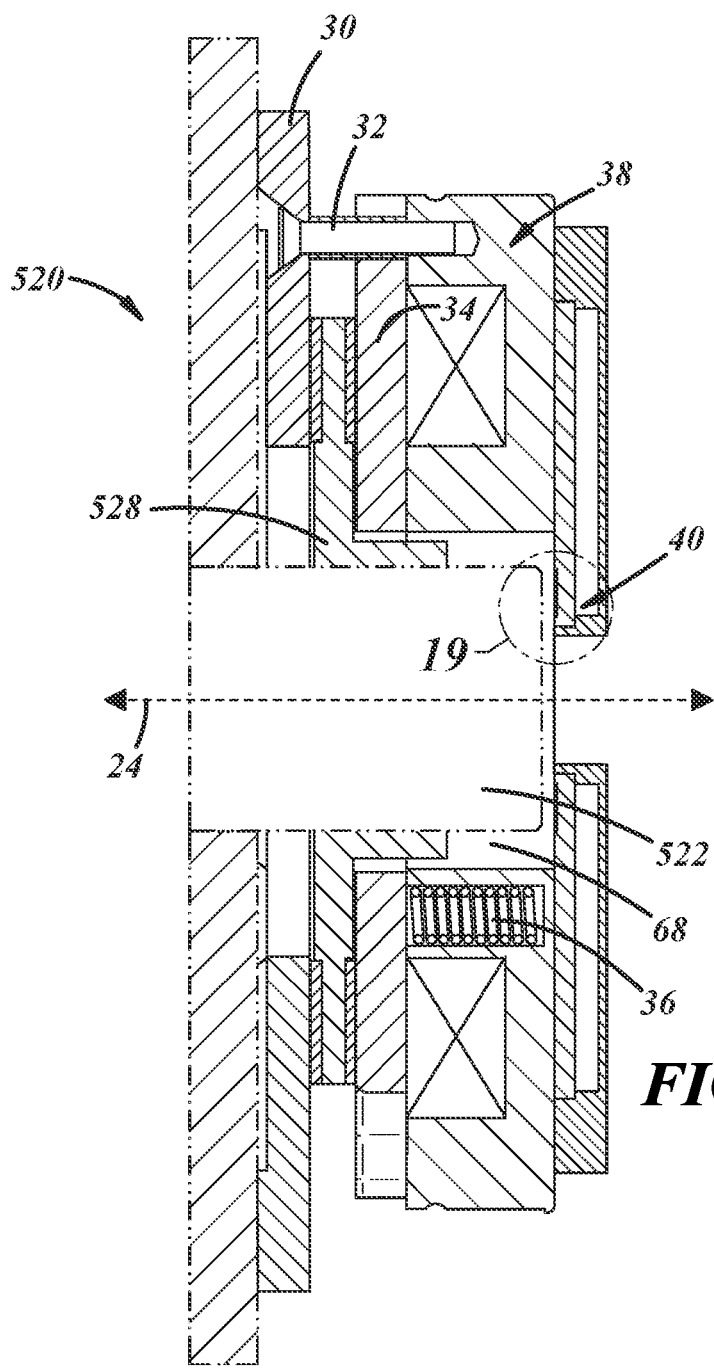
FIG. 18 is a cross-sectional view of a brake in accordance with another embodiment of the present teachings.
Figure 19:
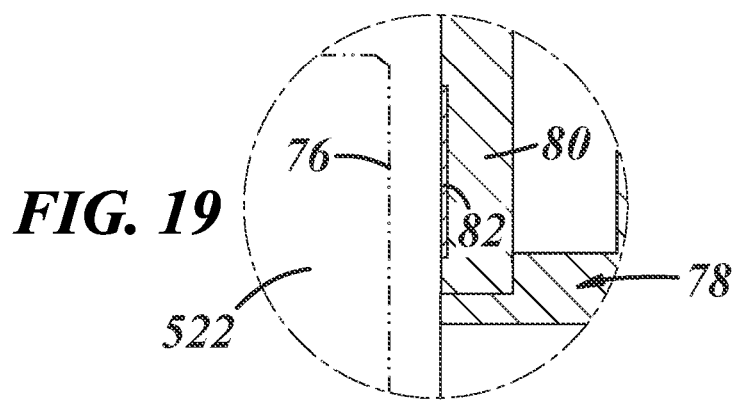
FIG. 19 is an enlarged cross-sectional view of a portion of the brake of FIG. 18.

Referring now to FIGS. 18-19, a brake 520 in accordance with another embodiment of the invention is illustrated. Brake 520 is substantially similar to the brake 420 discussed above and like reference numbers are again used to identify similar components. Brake 520 differs from brake 420 in that sensor assembly 40 is located on the opposite axial side of brake 520 relative to brake 420. In particular, while target 76 is again supported on the driven body 522 as opposed to the rotor 528, target 76 is supported on a radially extending face formed on or near the opposite end of body 522 and may be at least partially disposed within the central bore 68 of electromagnet 38 (although target 76 is supported on the axial end of body 522 in the illustrated embodiment, it should be understood that body 522 could again be configured with sections of varying diameter as in brake 422 such that target 76 is supported on a radially extending face formed between the axial ends of body 522). As in brakes 220 and 320, sensor assembly 40 is located adjacent electromagnet 38. Again, although not shown in the illustrated embodiment, electromagnet 38 may define a recess similar to recess 60 in brake plate 30 of brake 20 configured to receive sensor housing 78, PCB 80 and sensor 82.

A brake 20, 120, 220, 320, 420 or 520 in accordance with the present teachings is advantageous relative to conventional brakes. The brake 20, 120, 220, 320, 420 or 520 integrates a sensor assembly 40 in a manner that is relatively compact in the direction of the rotational axis 24 of a rotating body such as a motor output shaft. As a result, the brake 20, 120, 220, 320, 420 or 520 allows the rotational position of the motor output shaft to be determined without the need for a substantial increase in the axial length of the motor output shaft.

While the invention has been shown and described with reference to one or more particular embodiments thereof, it will be understood by those of skill in the art that various changes and modifications can be made without departing from the spirit and scope of the invention.

What is claimed is:
1. A brake, comprising:
a rotor configured for coupling to a rotating body for rotation therewith about a rotational axis;
an annular brake plate disposed about the rotational axis on a first side of the rotor and defining a central bore configured to receive the rotating body;
an armature disposed about the rotational axis on a second side of the rotor;
a spring configured to urge the armature in a first axial direction towards, and into engagement with, the rotor thereby urging the rotor in the first axial direction towards, and into engagement with, the brake plate to brake rotation of the rotor and rotating body;
an annular electromagnet disposed on an opposite side of the armature relative to the rotor and defining a central bore configured to receive the rotating body, the electromagnet configured to urge, when current is delivered to the electromagnet, the armature in a second axial direction away from, and out of engagement with, the rotor;

characterized by a target supported on a radially extending face of one of the rotating body and the rotor; and, a sensor aligned with the target through the central bore of the brake plate and configured to generate, responsive to the target, position signals indicative of a rotational position of the rotor and rotating body wherein the brake plate defines a recess on a side of the brake plate opposite the rotor and surrounding the central bore of the brake plate and the sensor is supported on a printed circuit board received within the recess.

2. The brake of claim 1 wherein the target is at least partially disposed within the central bore of the brake plate.

3. The brake of claim 1 wherein the radially extending face is on the rotor and the sensor is aligned with the target through the central bore of the brake plate.

4. The brake of claim 1 wherein the radially extending face is on the rotating body and the sensor is aligned with the target through the central bore of the brake plate.

5. The brake of claim 1 wherein the rotor includes a first portion configured for engagement with a first side of the brake plate and a second portion extending into the central bore of the brake plate and supporting the target.

6. The brake of claim 1 wherein the printed circuit board defines a central bore disposed about the rotational axis.

7. The brake of claim 1 wherein the printed circuit board is configured to receive the rotating body therethrough.

8. The brake of claim 1 wherein the target extends circumferentially about a portion of the rotational axis.

9. The brake of claim 1 wherein the target is semicircular in shape.

10. The brake of claim 1 wherein the sensor extends circumferentially about a portion of the rotational axis.

11. The brake of claim 1 wherein the sensor is annular in shape.

12. The brake of claim 1 wherein the sensor is axially spaced from the target.

13. The brake of claim 1
wherein the target is radially aligned with and radially inward of a radially innermost surface of the brake plate.

14. The brake of claim 1 wherein the target is positioned axially between first and second radial surfaces of the brake plate, the first radial surface on a first side of the brake plate and configured for engagement with the rotor, the second radial surface on a second side of the brake plate and the nearest radial surface of the brake plate facing away from the first radial surface of the brake plate.

15. The brake of claim 1 wherein the brake plate is radially spaced from the rotor along an entire axial length of the brake plate by only an air gap.

* * * * *